United States Patent
Kim

(10) Patent No.: US 7,441,738 B2
(45) Date of Patent: Oct. 28, 2008

(54) MONITOR DRIVING APPARATUS OF CAR AUDIO/VIDEO SYSTEM

(75) Inventor: Kyung Wook Kim, Icheon-shi (KR)

(73) Assignee: Hyundai Autonet Co., Ltd., Icheon-Shi, Kyungki-Do (KR)

(*) Notice: Subject to any disclaimer, the term of this patent is extended or adjusted under 35 U.S.C. 154(b) by 286 days.

(21) Appl. No.: 11/307,338

(22) Filed: Feb. 1, 2006

(65) Prior Publication Data

US 2006/0221562 A1  Oct. 5, 2006

(30) Foreign Application Priority Data

Mar. 28, 2005  (KR) .................. 10-2005-0025283

(51) Int. Cl.
*E04G 3/00* (2006.01)
*A47B 88/00* (2006.01)
*H04N 5/64* (2006.01)

(52) U.S. Cl. .......................... 248/292.12; 248/292.13; 248/917; 312/319.5; 345/110; 348/837

(58) Field of Classification Search .......... 248/291.1, 248/292.12, 292.13, 292.14, 917–922, 288.51, 248/284.1, 286.1; 312/319.6, 7.2, 319.5, 312/319.7; 345/87, 905, 108, 110; 361/681; 348/825, 836, 837
See application file for complete search history.

(56) References Cited

U.S. PATENT DOCUMENTS

| | | | | |
|---|---|---|---|---|
| 5,177,730 A | * | 1/1993 | Utsugi | ............... 360/137 |
| 5,362,144 A | * | 11/1994 | Shioya et al. | ............. 312/19.6 |
| 5,847,685 A | * | 12/1998 | Otsuki | ................ 312/7.2 |
| 6,682,157 B2 | * | 1/2004 | Ito | ................ 312/319.6 |

FOREIGN PATENT DOCUMENTS

| | | |
|---|---|---|
| KR | 100283966 | 12/1997 |
| KR | 1020030070777 | 2/2002 |

* cited by examiner

*Primary Examiner*—Amy J Sterling
*Assistant Examiner*—Tan Le
(74) *Attorney, Agent, or Firm*—IPLA P.A.; James E. Bame

(57) ABSTRACT

A monitor driving apparatus of a car audio/video system having a monitor is provided. The apparatus includes: a monitor main body hinged, at its lower end, to inside of the car audio/video system, and having a pair of mutually spaced pins provided at one side surface; a sliding plate installed at one side surface of the monitor main body, and having a first guide hole and a second guide hole; a driven gear installed at a gear shaft fixed to the inside of the car audio/video system; a driving arm having one end connected to the second guide hole, and the other end engaged with the driven gear; a worm wheel having a small-diameter part and a large-diameter part, the small-diameter part being toothed with the driving arm; a worm gear toothed with the large-diameter part; and a driving motor for providing a rotary force to the worm gear.

1 Claim, 2 Drawing Sheets

MONITOR DRIVING APPARATUS OF CAR AUDIO/VIDEO SYSTEM

BACKGROUND OF THE INVENTION

1. Field of the Invention

The present invention relates to a car audio/video system, and more particularly, to a monitor driving apparatus used for a car audio/video system.

2. Description of the Related Art

In general, a car audio/video system (including a navigation system) includes a monitor. The monitor is a part for outputting an image, and has a structure of being positioned inside before use and protruding to the outside in use.

FIG. 1 illustrates a construction of a conventional monitor driving apparatus of the car audio/video system.

As shown in FIG. 1, the monitor driving apparatus includes a monitor main body 10; a main body gear 11 installed at a side surface of the main body 10; a rack gear 12 toothed with the main body gear 11; a rack driving gear 13 moving the rack gear 12; a worm gear 14 toothed with the rack driving gear 13; and a driving motor 15 rotating the worm gear 14.

However, the above-described conventional monitor driving apparatus has a drawback in that the monitor is much freely moved, thereby causing a mechanical noise, and a visible angle of the monitor is varied when an external force such as vehicle's sudden stop in running is applied.

SUMMARY OF THE INVENTION

Accordingly, the present invention is directed to a monitor driving apparatus of a car audio/video system that substantially overcome one or more of the limitations and disadvantages of the conventional art.

One object of the present invention is to provide a monitor driving apparatus of a car audio/video system, in which a monitor can be fixed, and kept to be in an initial position without change even when an external force is applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a monitor driving apparatus of a car audio/video system having a monitor, the apparatus including: a monitor main body hinged, at its lower end, to inside of the car audio/video system, and having a pair of mutually spaced pins provided at one side surface; a sliding plate installed at one side surface of the monitor main body, and having a first guide hole through which the pin is inserted and a second guide hole provided at a lower side of the first guide hole; a driven gear installed at a gear shaft fixed to the inside of the car audio/video system; a driving arm having one end connected to the second guide hole, and the other end engaged with the driven gear; a worm wheel having a small-diameter part and a large-diameter part, the small-diameter part being toothed with the driving arm; a worm gear toothed with the large-diameter part of the worm wheel; and a driving motor for providing a rotary force to the worm gear.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
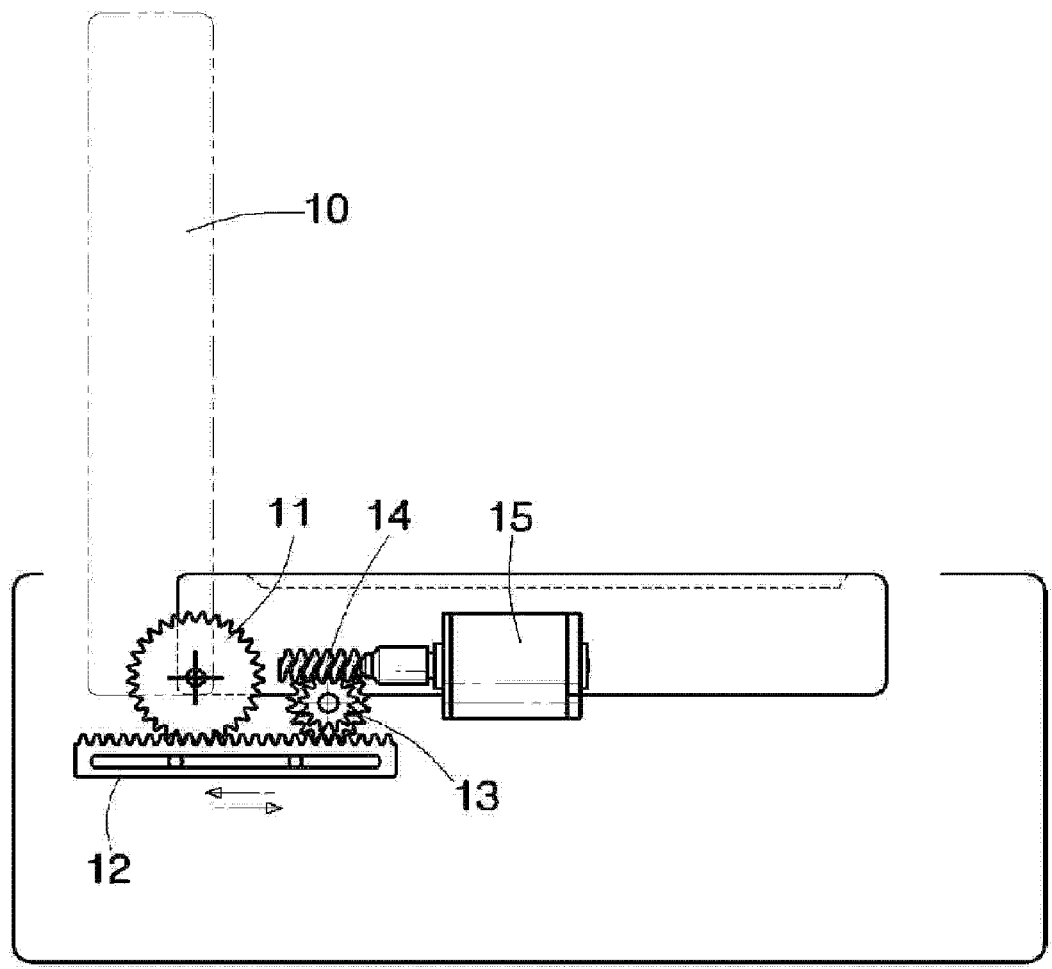
FIG. 1 illustrates a construction of a conventional monitor driving apparatus of a car audio/video system.

Reference will now be made in detail to the preferred embodiments of the present invention, examples of which are illustrated in the accompanying drawings. Wherever possible, the same reference numerals will be used throughout the drawings to refer to the same or like parts.

Figure 2:
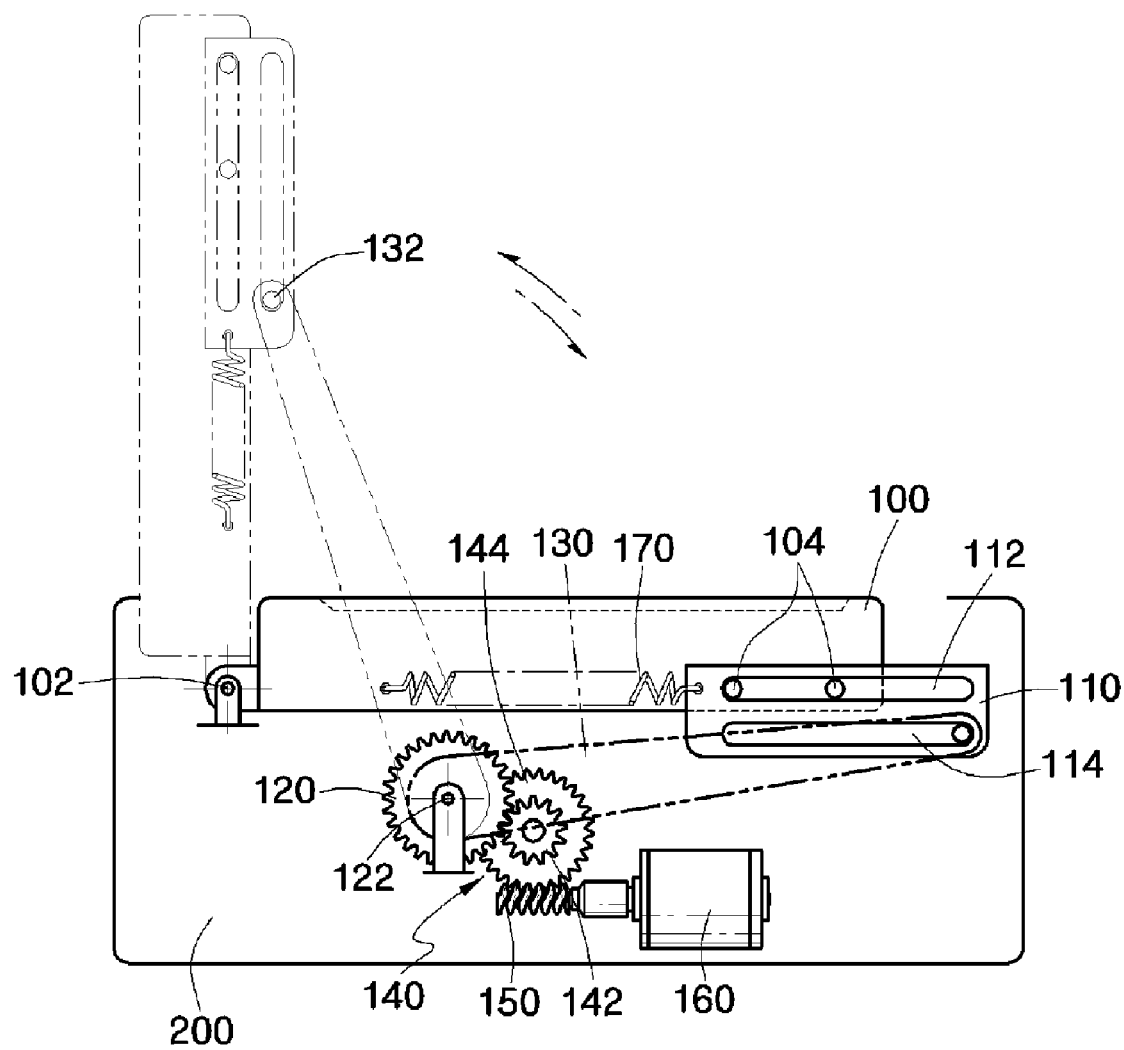
FIG. 2 illustrates a construction of a monitor driving apparatus of a car audio/video system according to a preferred embodiment of the present invention.

FIG. 2 illustrates a construction of a monitor driving apparatus of a car audio/video system according to a preferred embodiment of the present invention.

As shown in FIG. 2, the inventive monitor driving apparatus of the car audio/video system includes a monitor main body 100, a sliding plate 110, a driven gear 120, a driving arm 130, a worm wheel 140, a worm gear 150, and a driving motor 160, and further includes a coil spring 170.

The monitor main body 100 is a display member tilted depending on a use state. The monitor main body 100 is connected at its lower end, by a hinge 102, to inside of the car audio/video system 200, and has a pair of mutually spaced pins 104 at its one side surface.

The sliding plate 110 is a guide member installed at one side surface of the monitor main body 100. The sliding plate 110 includes a first guide hole 112 through which the pin 104 provided for the monitor main body 100 is inserted; and a second guide hole 114 provided at a lower side of the first guide hole 112.

The driven gear 120 is a gear member for rotating the driving arm 130. The driven gear 120 is installed at a gear shaft 122 fixed to inside of the car audio/video system 200.

The driving arm 130 is a rod shaped member for tilting the monitor main body 100 installed inside of the car audio/video system 200. The driving arm 130 is connected at its one end to the second guide hole 114 by an arm pin 132, and is engaged at the other end with the driven gear 120.

The worm wheel 140 is a gear member for connecting the driven gear 120 with the worm gear 150. The worm wheel 140 is comprised of a small-diameter part 142 and a large-diameter part 144, and the small-diameter part 142 is toothed with the driving arm 130.

The worm gear 150 is a gear member for transmitting a rotary force of the driving motor 160 to the worm wheel 140. The worm gear 150 is toothed with the large-diameter part 144 of the worm wheel 140.

The driving motor 160 is a means for providing the rotary force to the worm gear 150.

The coil spring 170 is an elastic means for preventing mobility of the sliding plate 110. The coil spring 170 is connected at its one end to the sliding plate 110, and is fixed at the other end to the monitor main body 100.

Meanwhile, an operation of the inventive monitor driving apparatus of the car audio/video system will be described as follows.

In such a state that the monitor main body 100 is installed inside of the car audio/video system 200, the driving motor 160 is rotated. If so, the worm gear 150, the worm wheel 140, and the driven gear 120 are rotated while the driving arm 130 is rotated. At this time, the sliding plate 110 connected with the driving arm 130 moves inside while tilting the monitor main body 100.

As described above, the inventive monitor driving apparatus of the car audio/video system has an effect in that, by the engagement of the driving arm and the sliding plate, the monitor main body is tilted and therefore, a monitor is fixed, thereby preventing a mechanical noise and, even when an external force such as a sudden stop of a vehicle is acted, a visible angle of the monitor is not varied, thereby making it possible to stably enjoy a video.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A monitor driving apparatus of a car audio/video system having a monitor, the apparatus comprising:
   a monitor main body hinged, at its lower end, to inside of the car audio/video system, and having a pair of mutually spaced pins provided at one side surface:
   a sliding plate installed at one side surface of the monitor main body, and having a first guide hole through which the pin is inserted and a second guide hole provided at a tower side of the first guide hole;
   a driven gear installed at a gear shaft fixed to the inside of the car audio/video system;
   a driving arm having one end connected to the second guide hole, and the other end engaged with the driven gear;
   a worm wheel having a small-diameter part and a large-diameter part, the small-diameter part being toothed with the driving arm; a worm gear toothed with the large-diameter part of the worm wheel;
   a driving motor for providing a rotary force to the worm gear; and
   a coil spring having one end connected to the sliding plate and the other end fixed to the monitor main body.

* * * * *